United States Patent

[11] 3,598,438

[72] Inventor Edmund Taft
 703 Madison Ave., Daytona Beach, Fla. 32014
[21] Appl. No. 827,430
[22] Filed May 23, 1969
[45] Patented Aug. 10, 1971

[54] HOLDER FOR HOT CASSEROLE DISH
 2 Claims, 3 Drawing Figs.
[52] U.S. Cl. .................................................. 294/29
[51] Int. Cl. ............................................. A47j 45/00
[50] Field of Search .......................................... 299/29, 31, 32, 30, 31 A

[56] References Cited
 UNITED STATES PATENTS
 1,551,592 1/1925 Weatherford ................ 294/29

FOREIGN PATENTS
23,194 9/1930 Australia ..................... 294/29

Primary Examiner—Evon C. Blunk
Assistant Examiner—Douglas D. Watts
Attorney—Charles L. Lovercheck ABSTRACT: This specification discloses a holder for a hot dish. The holder is made up of a flat base with a loop on the front end to receive the end of a dish and a fingerlike member attached to a spring-loaded handle. The handle may be moved down to bring a finger attached to the handle into engagement with the inside of the dish whereby the dish is held positively to the base. The handle is urged to move with this finger away from the dish by a compression spring. A lug is fixed to the handle and the thumb of an operator can engage the lug and force the finger down into engagement with the dish.

Inventor
EDMUND TAFT

By
Charles L. Loverdah
Attorney

HOLDER FOR HOT CASSEROLE DISH

STATEMENT OF INVENTION

This invention relates to dish holders and, more particularly, for holders for hot dishes,

OBJECTS OF THE INVENTION

It is an object of the invention to provide an improved dish holder.

Another object of the invention is to provide a dish holder that is simple in construction, economical to manufacture, and simple and efficient to use.

DETAILED DESCRIPTION OF DRAWINGS

Figure 1:
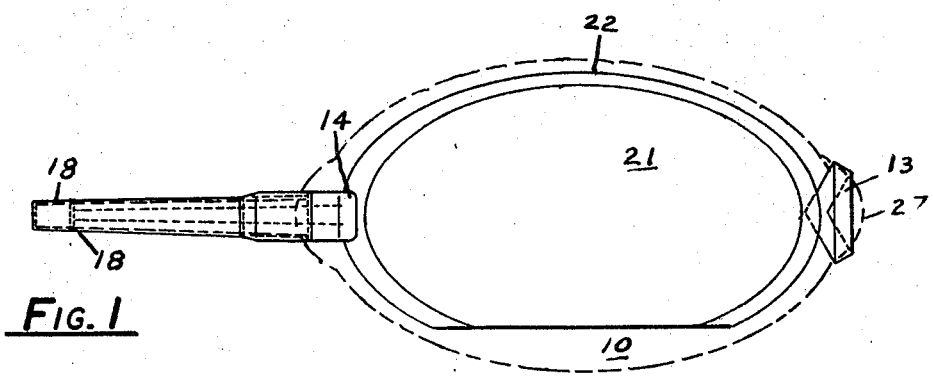
FIG. 1 is a top view of the hot holder according to the invention.
Figure 2:
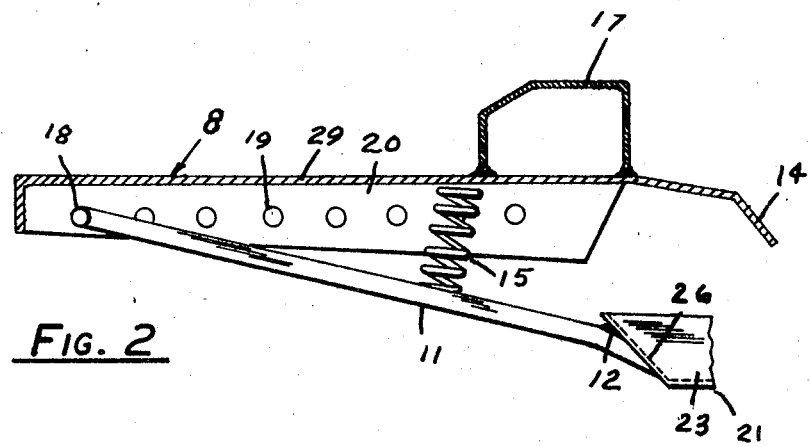
FIG. 2 is a partial longitudinal cross-sectional view of the hot holder shown in FIG. 1.
Figure 3:
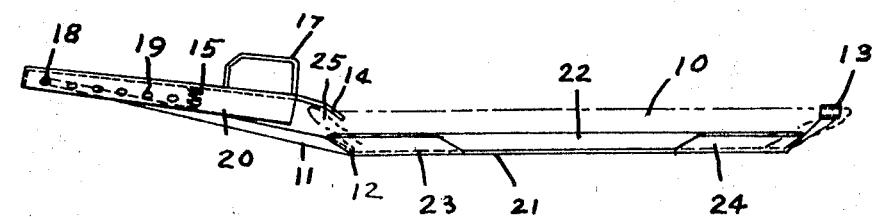
FIG. 3 is a side view of the holder shown in FIG. 1 with the dish shown in phantom, therein.

Now with more particular reference to the drawings, a dish 10 is shown which is generally oval shaped and has a rim inclining upwardly and outwardly therefrom. The dish rests on the base 21 of the holder. The base has a fixed handle fixed to it at 12 and it has the upwardly and rearwardly extending wall part 26 and the upwardly and laterally extending wall part 22 with the spaced outwardly inclined wall portions 23 and 24 which conform generally to the bottom of the dish. A loop 13 is fixed to the end of the dish holder remote from the handle 11 and the loop 13 receives the end 27 of the dish. A finger-engaging lug 17 is fixed to the movable handle 8 which is pivoted to the fixed handle 11 at 18. The outwardly extending ends 18 of the fixed handle 11 engage one of the spaced holes 18 which are formed in downwardly extending flanges 20 of the channel which has a top flat web 29. The compression spring 15 urges the movable handle 8 to swing about the ends 18 of the fixed handle 11 and the finger 14 which is fixed to the end of the fixed handle engages the end 25 of the dish. In operation, the edge of the base 21 at the side of the side portions 23 and 24 are slid under the dish and the end 27 of the dish is caused to move into the loop 13. Then with the bottom of the dish supported above the base 21, the movable handle is forced down so that the finger 14 engages the end 25 of the dish, thus the dish is clamped firmly in position in the holder.

The embodiments of the invention in which I claim an exclusive property or privilege are defined as follows:

1. A dish holder in combination with a dish, said dish holder comprising a base, a fixed handle fixed to said base, a movable handle swingably attached to said fixed handle at the distal end thereof, spring means urging said movable handle away from said fixed handle, and a loop fixed to said base remote from said handle, said dish having an end extending into said loop, and a finger engaging the inside of said dish and fixed to said movable handle, said movable handle being in the form of a downwardly open channel having spaced flanges, spaced holes in said flanges and pivot means on said fixed handle for swingable mounting said movable handle, and a thumb-engaging lug on said movable handle at the distal end thereof.

2. A dish holder comprising a base,
   a fixed handle fixed to said base,
   a movable handle swingably attached to said fixed handle at the distal end thereof,
   spring means urging said movable handle away from said fixed handle,
   a loop fixed to said base remote from said handle,
   said loop being adapted to receive an end of a dish,
   said fixed handle comprises two rods fixed to said base and each having an elongated part extending generally parallel to each other,
   the distal ends of said rods being bent outward generally at right angles to said parallel elongated part,
   said ends of said movable handle comprising a flange and two legs,
   said outwardly extending legs extending through holes in said channel legs, whereby said movable handle is swingably attached to said fixed handle.